(12) United States Patent
Umemoto et al.

(10) Patent No.: US 8,277,528 B2
(45) Date of Patent: Oct. 2, 2012

(54) DUST REMOVAL SYSTEM FOR A RIDING LAWN MOWER

(75) Inventors: Hideya Umemoto, Sakai (JP); Eiji Satou, Sakai (JP); Takeshi Komorida, Sakai (JP); Yoshihiro Ueda, Sakai (JP); Masato Asahara, Kobe (JP); Kazuhiro Ochi, Sakai (JP); Masahiro Yamada, Sakai (JP)

(73) Assignee: Kubota Corporation, Osaka (JP)

( * ) Notice: Subject to any disclaimer, the term of this patent is extended or adjusted under 35 U.S.C. 154(b) by 617 days.

(21) Appl. No.: 12/203,337

(22) Filed: Sep. 3, 2008

(65) Prior Publication Data
US 2009/0241498 A1    Oct. 1, 2009

(30) Foreign Application Priority Data

Mar. 31, 2008    (JP) .................................. 2008-090312

(51) Int. Cl.
*B01D 45/00* (2006.01)
(52) U.S. Cl. .......................... 55/385.3; 554/406; 56/17.4
(58) Field of Classification Search .................. 55/385.3, 55/385.7, 283, 290, 302, 403, 502, 429, 432; 56/10.1, 167, 202, 12.2, 16.7, 17.4–17.5
See application file for complete search history.

(56) References Cited

U.S. PATENT DOCUMENTS 4,654,059 A * 3/1987 Matyas ........................... 55/283
5,431,601 A * 7/1995 Nakamura .................... 464/175

FOREIGN PATENT DOCUMENTS

JP    2005287341    10/2005

* cited by examiner

*Primary Examiner* — Duane Smith
*Assistant Examiner* — Karla Hawkins
(74) *Attorney, Agent, or Firm* — The Webb Law Firm

(57) ABSTRACT

A dust removal system for a riding lawn mower, comprising an engine, a speed change device disposed outside of an engine compartment, and a universal coupling inserted through an opening provided to a separating wall in order to connect an output shaft of the engine and an input shaft of the speed change device. The dust removal system is composed of a perforated board which rotates integrally with the output shaft and around the axis of the output shaft in order to impede grass cuttings from flowing into the engine compartment through the opening, the perforated board having an insertion hole formed in the center to allow the universal coupling to be inserted; and a seal unit for substantially sealing the space between the universal coupling and the peripheral edge of the insertion hole. The seal unit has a radially extending flange formed on the universal coupling, and a ring member in which one end is mounted on the flange and the other end is in contact with the peripheral area around the insertion hole.

12 Claims, 7 Drawing Sheets

DUST REMOVAL SYSTEM FOR A RIDING LAWN MOWER

BACKGROUND OF THE INVENTION

1. Field of the Invention

The present invention relates to a dust removal system for a riding lawn mower, comprising an engine disposed within an engine compartment partitioned by a separating wall, a speed change device disposed outside of the engine compartment, and a universal coupling inserted through an opening provided in the separating wall in order to connect an output shaft of the engine with an input shaft of the speed change device.

2. Description of the Related Art

One example of a conventional dust removal system for a riding lawn mower comprises a universal coupling which fits in an open edge of a draft guide cover for covering a cooling fan from the front, with the cooling fan rotating integrally with an output shaft of an engine; and a perforated board which rotates integrally with the universal coupling, wherein grass cuttings are prevented by the perforated board from flowing into an engine compartment through the opening in the draft guide cover. This example is known from JP (Kokai) No. 2005-287341. The universal coupling is composed of a first connecting shaft connected to the output shaft of the engine, an intermediate shaft, and a second connecting shaft fitted by splines with an input shaft of a transmission mechanism; and is configured so that the shafts are all bendably connected, and the perforated board rotates integrally with the intermediate shaft of the universal coupling. The draft guide cover is provided so as to cover the cooling fan from the front, with the cooling fan rotating integrally with the output shaft of the engine.

In the conventional dust removal system described above, when the universal coupling bendably deforms due to the vibration of the engine or another such cause, the perforated board is swingably displaced relative to the draft guide cover about the connecting part between the first connecting shaft and the intermediate shaft in the universal coupling. When the space between the perforated board and the draft guide cover is therefore enlarged in order to avoid interference between the perforated board and the draft guide cover due to the swinging displacement, there is a greater possibility that grass cuttings or other such small debris will flow with outside air into the engine compartment through the space between the perforated board and the draft guide cover. As a result, grass cuttings and other such small debris adhere to and accumulate in the periphery of the engine and other such locations, increasing the danger of overheating as a result of impeding the flow of outside air. When the space between the perforated board and the draft guide cover is made smaller in order to avoid such occurrences, the perforated board readily interferes with the draft guide cover, and there is a danger that this interference will cause unusual sounds or damage to the perforated board or draft guide cover.

In view of this, it has been proposed that by configuring the perforated board to rotate both around and integrally with the output shaft of the engine, the perforated board will not be swingably displaced even if the universal coupling bendably deforms due to the vibration of the engine or other such causes. The intention is to thereby forestall the occurrence of unusual sounds and damage to the perforated board or draft guide cover due to interference between the perforated board and draft guide cover resulting from the swinging displacement of the perforated board, without enlarging the space between the perforated board and the draft guide cover. However, in this configuration, when the universal coupling bendably deforms due to the vibration of the engine or another such cause, the intermediate shaft of the universal coupling inserted through an insertion hole in the perforated board is swingably displaced relative to the perforated board about the connecting part with the first connecting shaft. Therefore, the insertion hole in the perforated board must be formed large in diameter so as to ensure a space between the perforated board and the intermediate shaft in order to avoid interference between the perforated board and the intermediate shaft as a result of the swinging displacement of the intermediate shaft. However, the circumference of the space secured between the perforated board and the intermediate shaft in this arrangement is much shorter than the circumference of the space formed between the perforated board and the draft guide cover. As a result, there is less of a possibility that grass cuttings or other such small debris will flow with outside air into the engine compartment through the space, in comparison with cases in which a space for avoiding interference between the perforated board and draft guide cover is formed therebetween. However, despite either of the circumferences being small, grass cuttings or other such small debris will flow with outside air through the space between the perforated board and the intermediate shaft, and there is therefore a possibility that the grass cuttings and other such small debris that have flowed in will adhere to and accumulate in the periphery of the engine and other such locations, impeding the flow of outside air in the engine compartment. In other words, there is room for improvement in terms of more effectively suppressing overheating caused by grass cuttings or other such small debris adhering to and accumulating in the engine compartment interior.

SUMMARY OF THE INVENTION

An object of the present invention is to more effectively suppress the flow of grass cuttings or other such small debris into the engine compartment, thereby more effectively reducing the possibility that overheating will occur as a result of the grass cuttings and other such small debris that have flowed in adhering to and accumulating in the engine compartment interior and impeding the flow of outside air.

To achieve the object described above, the dust removal system according to the present invention is a dust removal system for a riding lawn mower comprising an engine disposed within an engine compartment partitioned by a separating wall, a speed change device disposed outside of the engine compartment, and a universal coupling inserted through an opening provided in the separating wall in order to connect an output shaft of the engine with an input shaft of the speed change device; the dust removal system comprising:

a perforated board which rotates integrally with the output shaft around the axis of the output shaft in order to inhibit grass cuttings from flowing into the engine compartment through the opening, wherein an insertion hole for allowing the universal coupling to be inserted is formed in the center of the perforated board; and a seal unit for substantially sealing a space between the universal coupling and a peripheral edge of the insertion hole.

It is preferable to use a layout in which the region of the universal coupling farther down along the direction of power transmission is inserted through the insertion hole.

According to this dust removal system, the seal unit makes it possible to impede grass cuttings or other such small debris from flowing into the engine compartment through the space between the perforated board and the universal coupling, even if the insertion hole of the perforated board is formed to a diameter large enough to avoid interference between the perforated board and the universal coupling as a result of bending deformation of the universal coupling due to the vibration of the engine or the like, component precision, assembly precision, and other such causes.

Therefore, it is possible to prevent the occurrence of unusual sounds as well as damage to the perforated board resulting from the universal coupling interfering with the perforated board, and also to more effectively reduce the possibility of overheating resulting from grass cuttings or other such small debris flowing into the engine compartment, adhering to and accumulating in the periphery of the engine and other locations, and impeding the flow of outside air in the engine compartment.

In one preferred embodiment, the seal unit is configured from a radially extending flange formed on the universal coupling, and a ring member, preferably made of an elastic material, in which one end is mounted on the flange and the other end is in contact with the peripheral area around the insertion hole. The sealing of the seal unit can be improved by means of the elastic deformation of the ring member.

Furthermore, it is preferable to dispose a cutter which rotates integrally with the perforated board around the output shaft nearer to the engine than the perforated board. In cases in which grass cuttings flow with the outside air into the engine compartment through the holes in the perforated board, the grass cuttings can be more finely cut by the cutter. It is thereby possible to prevent long grass cuttings from flowing into the engine compartment through the holes in the perforated board and accumulating on the engine and other locations, and also to avoid instances of grass cuttings or other such small debris accumulating on the already trapped grass cuttings.

Other characteristics and merits of the present invention should be made clear from the description of the embodiments using the following drawings.

DESCRIPTION OF THE PREFERRED EMBODIMENTS

The following is a description, made with reference to the diagrams, of an embodiment in which the dust removal system for a riding lawn mower according to the present invention, which is an example of a preferred embodiment for carrying out the present invention, is applied to a zero-turn mower, which is an example of a riding lawn mower.

Figure 1:
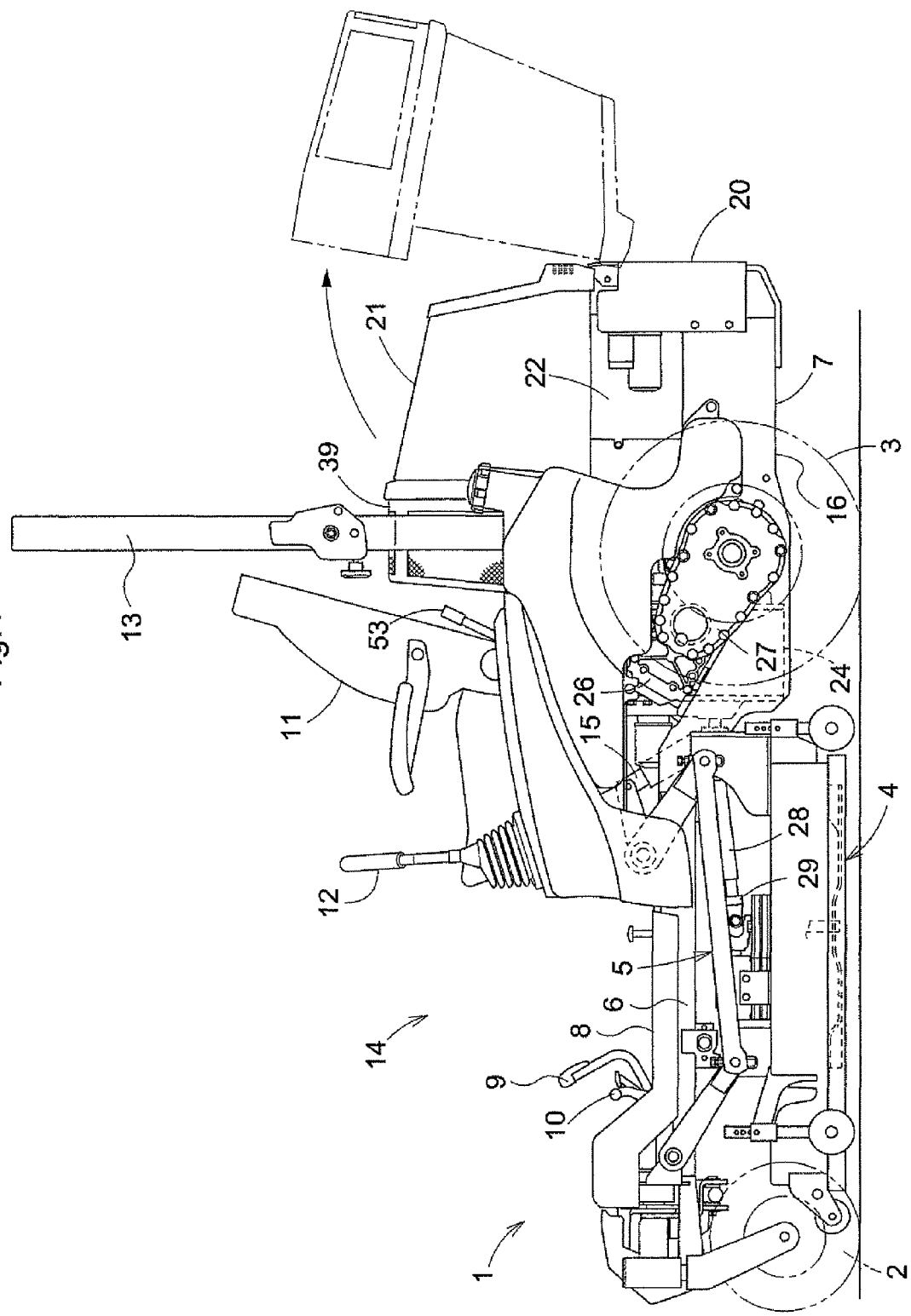
FIG. 1 is an overall side view of a zero-turn mower.

FIG. 1 is an overall side view of a zero-turn mower. The zero-turn mower is designed as a mid-mount mower, wherein a mower 4 is placed between a pair of left and right front wheels 2 and a pair of left and right rear wheels 3 in a riding-type travelling vehicle body 1, as is shown in the diagram.

The travelling vehicle body 1 comprises a front frame 6 for supporting the left and right front wheels 2 in a manner that allows their orientations to be varied around a longitudinal axis, and for suspendably supporting the mower 4 in a manner that allows the mower 4 to be raised and lowered via a link mechanism 5, wherein a rear frame 7 is connected to the rear end part of the front frame 6. The left and right front wheels 2 are caster wheels, and the left and right rear wheels 3 are drive wheels.

A boarding step 8 is laid over the front frame 6 so as to cover substantially the entire frame from the top. The front center of the front frame 6 is provided with a brake pedal 9 urged to return to a non-braking position, and a lock pedal 10 which allows the brake pedal 9 to fit in and remain at a braking position against the urging. Behind and above the boarding step 8, a driver seat 11 is mounted in a manner that allows the position of the seat to be adjusted. A cross-swinging neutral-return type speed change lever 12 is placed on both the left and right sides of the driver seat 11. An arch-shaped protective frame 13 is erected behind the driver seat 11. In other words, a boarded driver section 14 is formed in the front half side of the travelling vehicle body 1 in the zero-turn mower. The link mechanism 5 is configured as a hydraulic raising/lowering type mechanism, whereby the mower 4 is displaced upward and downward in parallel by the action of a single-acting hydraulic cylinder 15 placed in the longitudinal middle of the travelling vehicle body 1.

Figure 2:
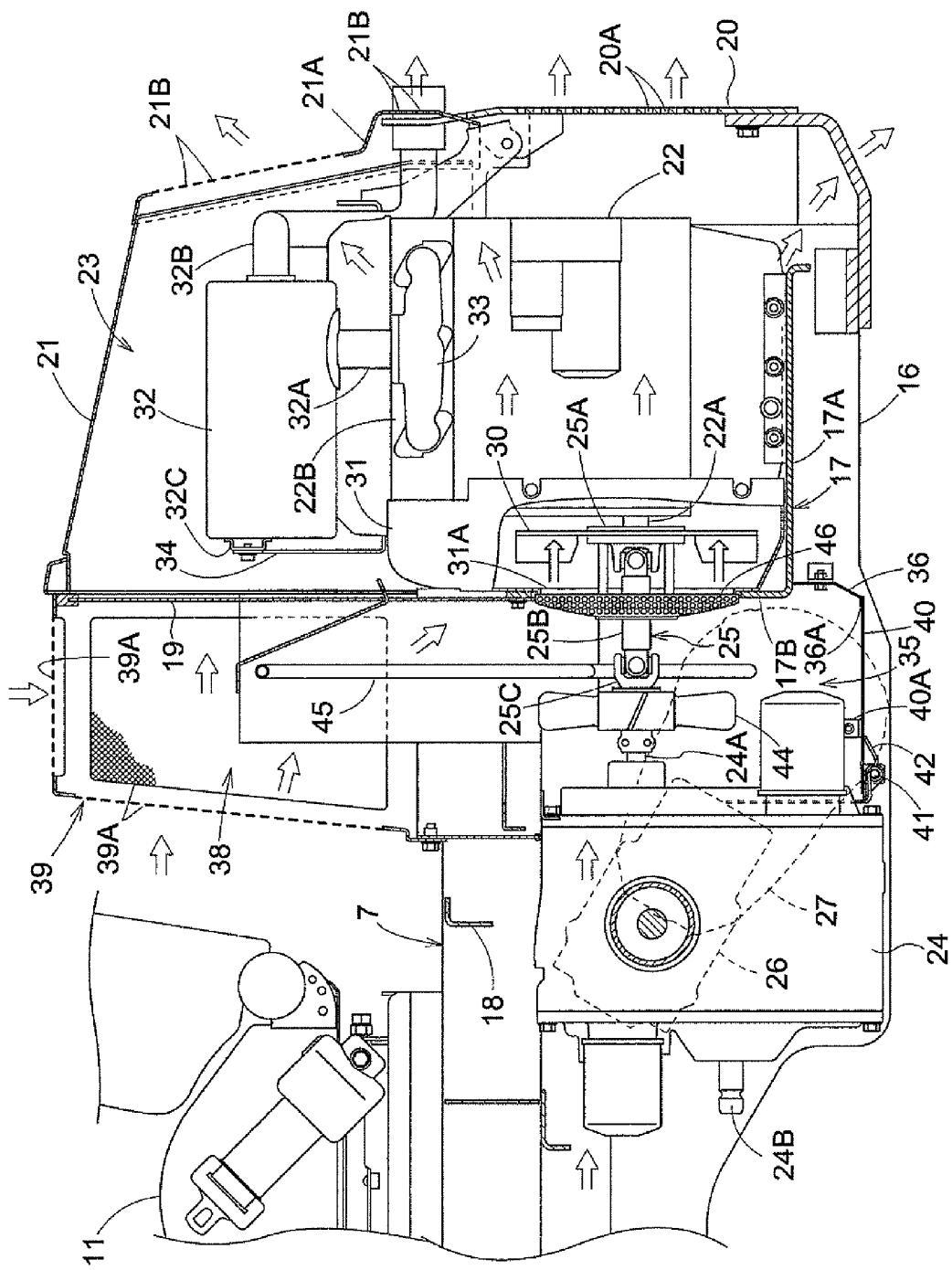
FIG. 2 is a longitudinal cross-sectional side view of an engine area including the dust removal system.

The rear frame 7 is configured with a mounting stand 17, a cross member 18, and other components connected to a pair of left and right side members 16, as shown in FIGS. 1 and 2. The mounting stand 17 comprises a bottom wall 17A and a front wall 17B, and is formed to bend in the shape of a substantial L as viewed from the side. A partitioning wall 19 which protrudes upward from the front wall 17B is connected to the mounting stand 17. A rear cover 20 provided with a plurality of exhaust holes 20A is connected to the rear end part of the rear frame 7. A top cover 21 provided with a plurality of exhaust holes 21B in a rear wall 21A is connected to the rear cover 20 so as to be capable of an opening and closing swinging operation about the rear end top part of the rear cover 20. An air-cooled engine 22 is mounted on the bottom wall 17A of the mounting stand 17 such that an output shaft 22A thereof protrudes toward the front of the vehicle body. In other words, in the zero-turn mower, the rear frame 7 comprises the partitioning wall 19, the rear cover 20, and the top cover 21, thus forming an engine compartment 23.

The output shaft 22A of the engine 22 is connected via a universal coupling 25, in a manner that enables power transmission, to an input shaft 24A of a transmission mechanism (an example of a speed change device) 24 disposed to the front of and below the engine 22 outside of the engine compartment. The transmission mechanism 24 reduces and transmits power from the engine 22, and the reduced power is split and outputted as travelling power and operating power. Hydrostatic continuously variable speed change devices (hereinbelow abbreviated as HSTs) 26 for varying the travelling power from the transmission mechanism 24 are connected to both the left and right sides of the transmission mechanism 24. Connected to the laterally outer sides of the left and right HSTs 26 are reduction devices 27 for reducing and transmitting the power varied by the HSTs 26 to the corresponding rear wheels 3. Speed change operation shafts of the left and right HSTs 26 are operatively connected to the corresponding speed change levers 12 so as to undergo speed-changing action on the basis of the longitudinal swinging operations of the corresponding speed change levers 12. In other words, in the zero-turn mower, by swingably operating the left and right speed change levers 12 forward and backward, the HSTs 26 corresponding to the speed change levers 12 can be made to undergo speed-changing action, and the left and right rear wheels 3 can be driven independently at different speeds.

This configuration makes it possible to arbitrarily achieve, in the zero-turn mower, a stopped state in which the left and right speed change levers 12 are positioned in the neutral positions to stop the left and right rear wheels 3; a linearly moving state in which the left and right speed change levers 12 are moved from the neutral positions in the same direction and positioned in the same operating positions to drive the left and right rear wheels 3 forward or backward at the same speed; a slowly turning state in which the left and right speed change levers 12 are moved from the neutral positions in the same direction and positioned in different operating positions to drive the left and right rear wheels 3 forward or backward at different speeds; a pivot turning state in which one of the left and right speed change levers 12 is swingably displaced from the neutral position while the other speed change lever 12 remains positioned in the neutral position, and one of the left and right rear wheels 3 is driven forward or backward while the other rear wheel 3 remains stopped; and a spin turning state in which the left and right speed change levers 12 are swingably displaced in different directions from the neutral positions, and one of the left and right rear wheels 3 is driven forward while the other rear wheel 3 is driven backward.

A PTO shaft 24B, which enables operating power to be extracted to the mower 4, is mounted on the front bottom part of the transmission mechanism 24. The PTO shaft 24B transmits operating power from the transmission mechanism 24 to the mower 4 via a transmission shaft 28 configured to be capable of extending and retracting, or via universal couplings 29 provided to both ends of the transmission shaft 28. In other words, constant-speed power is transmitted to the mower 4 regardless of the travelling speed or travelling state.

An engine-cooling fan 30, which rotates integrally with the output shaft 22A of the engine 22 via the universal coupling 25, and a draft guide cover 31 for covering the cooling fan 30 from the front, are mounted on the front part of the engine 22 as shown in FIGS. 2 through 6. The universal coupling 25 bendably connects a first connecting shaft 25A connected to the output shaft 22A of the engine 22, an intermediate shaft 25B located at a position downstream in the direction of power transmission, and a second connecting shaft 25C fitted by splines with the input shaft 24A of the transmission mechanism 24.

The universal coupling 25 is inserted through the front wall 17B of the mounting stand 17 and the draft guide cover 31, which function as separating walls for separating the engine 22 and the transmission mechanism 24. Also formed in the front wall 17B and the draft guide cover 31 are openings 17C, 31A. The openings are circular when viewed from the front, and enable outside air to be taken into the engine compartment from the transmission mechanism due to the rotation of the cooling fan 30. The draft guide cover 31 guides outside air taken in through the opening 31A to the periphery of the engine 22. Part of the outside air flows from the periphery of the engine 22 to a muffler 32 positioned above the engine 22. Having cooled the engine 22, the muffler 32, and other components, the outside air flows to the outside of the vehicle through the exhaust holes 20A of the rear cover 20, the exhaust holes 21B of the top cover 21, and other openings.

Figure 7:
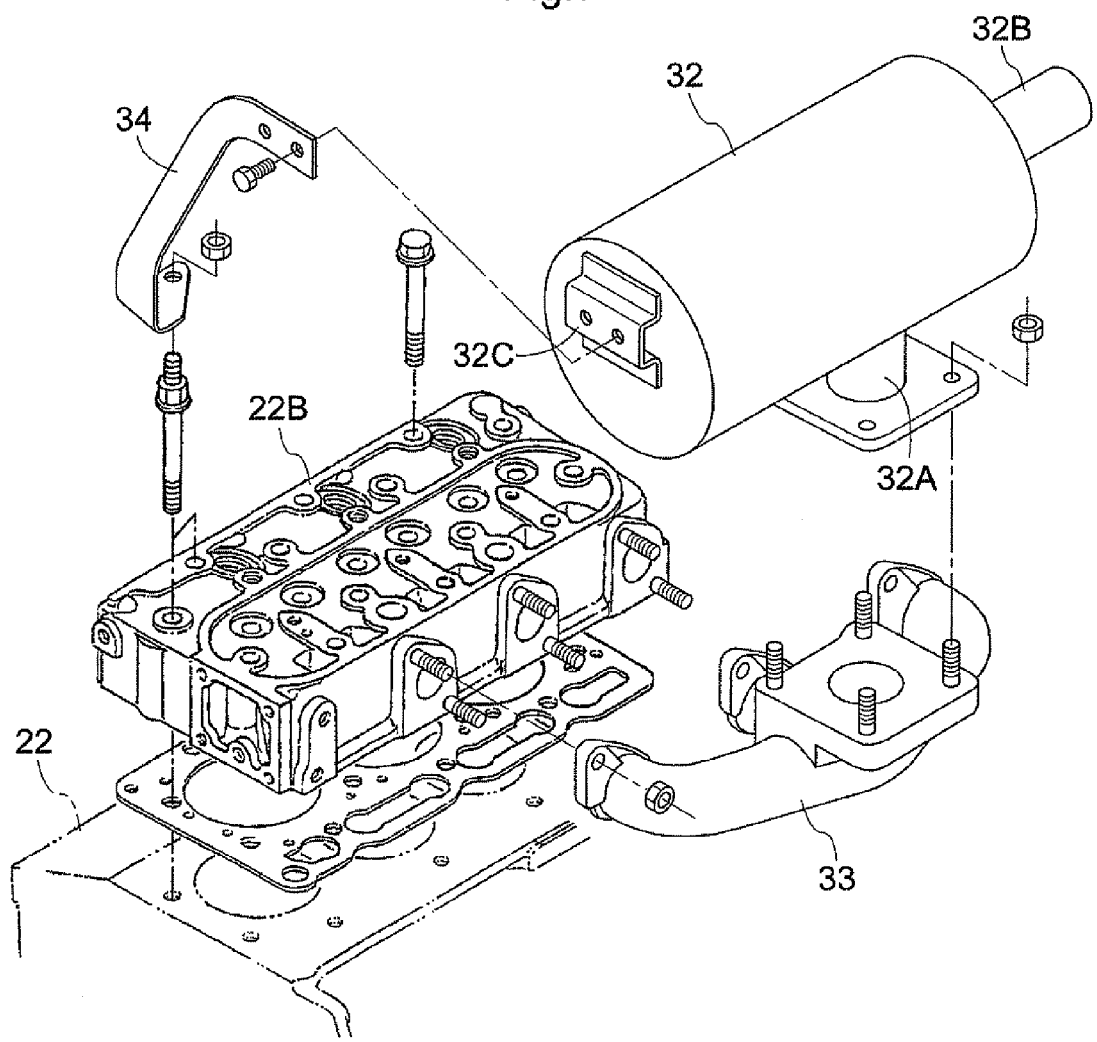
FIG. 7 is an exploded perspective view showing the support structure of the muffler.

The muffler 32 comprises a connecting tube 32A and an exhaust tube 32B at one end, and this one end is positioned at the rear of the vehicle body and is oriented longitudinally in the engine compartment 23, as shown in FIGS. 2 and 7. Furthermore, the muffler 32 is connected to an exhaust manifold 33 via the connecting tube 32A and is positioned in the engine compartment in the center of the vehicle body. It is thereby possible to reduce the turning radius of the vehicle body over cases in which the muffler 32 is disposed in the engine compartment at the rear of the vehicle body.

A bracket 32C is integrally mounted on the front end part of the muffler 32, and the bracket 32C supports the front end part on a cylinder head 22B of the engine 22 via a stay 34. The front and rear ends of the muffler 32 can thereby be connectably supported on the engine 22 by the connecting tube 32A and the stay 34, the phase difference with the vibration of the engine 22 can be reduced in comparison with cases in which the muffler 32 is connectably supported on the engine 22 only by the connecting tube 32A provided to one end of the muffler 32, and the vibration of the muffler 32 can be suppressed. As a result, it is possible to suppress loss of durability in the muffler 32, the exhaust manifold 33, and other components due to the vibration of the engine 22.

The stay 34 is detachably connected by bolting to the front end part of the muffler 32 and to the cylinder head 22B of the engine 22. The occurrence of stress during assembly can thereby be reduced in comparison with cases in which the stay 34 is welded.

Figure 3:
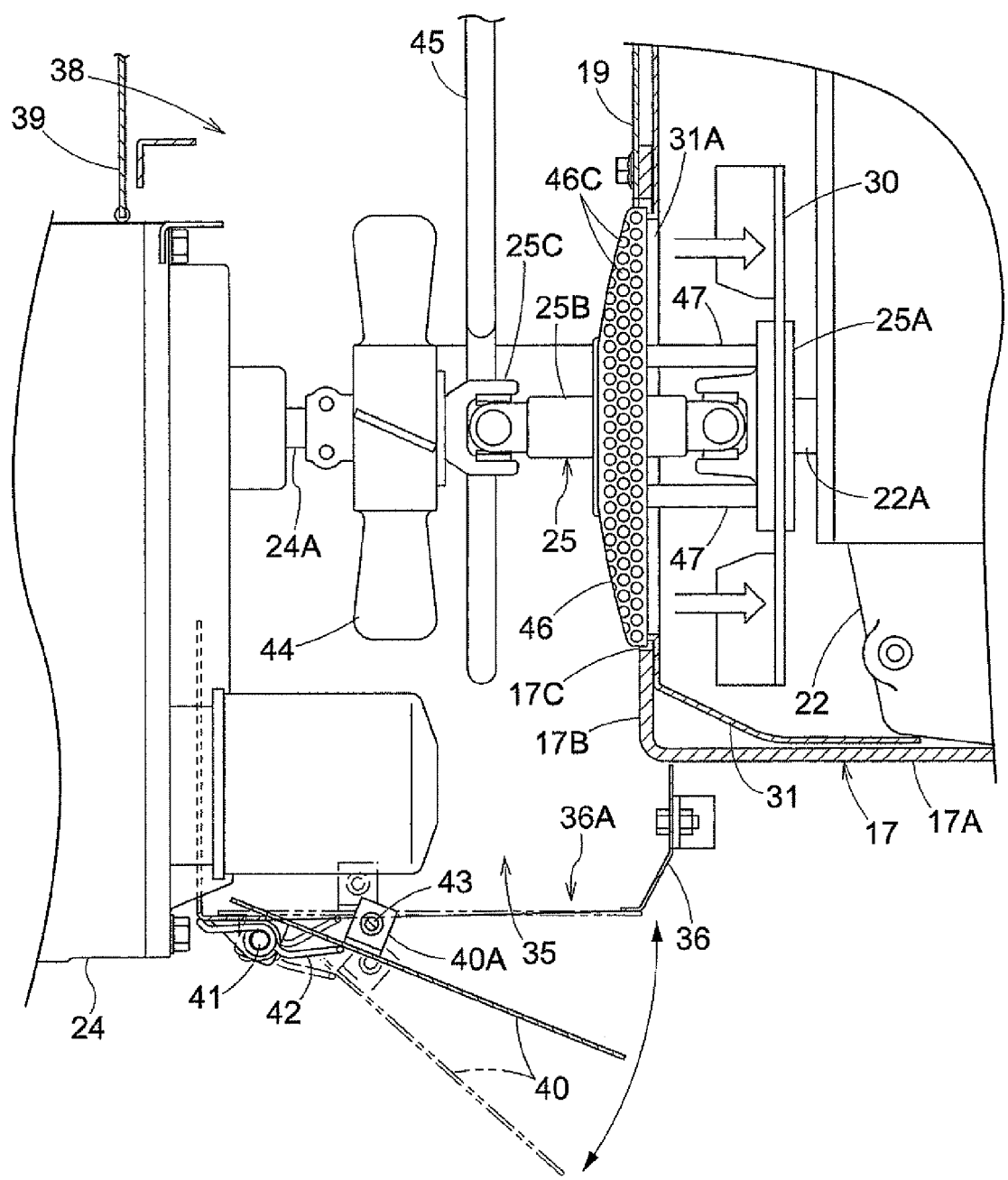
FIG. 3 is a partial longitudinal cross-sectional side view showing the dust removal system.
Figure 4:
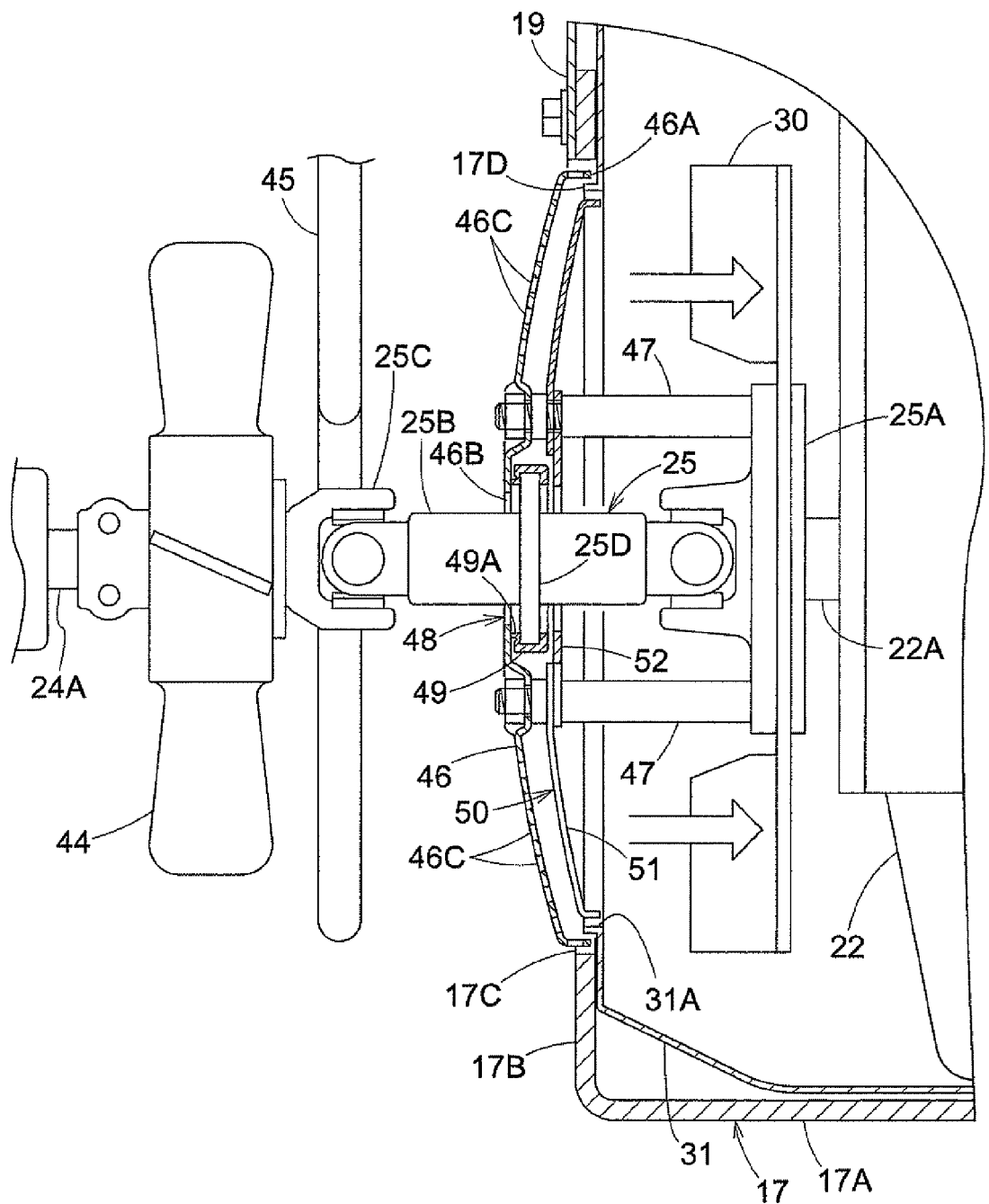
FIG. 4 is a longitudinal cross-sectional side view showing the cross-sectional structure of the dust removal system.
Figure 5:
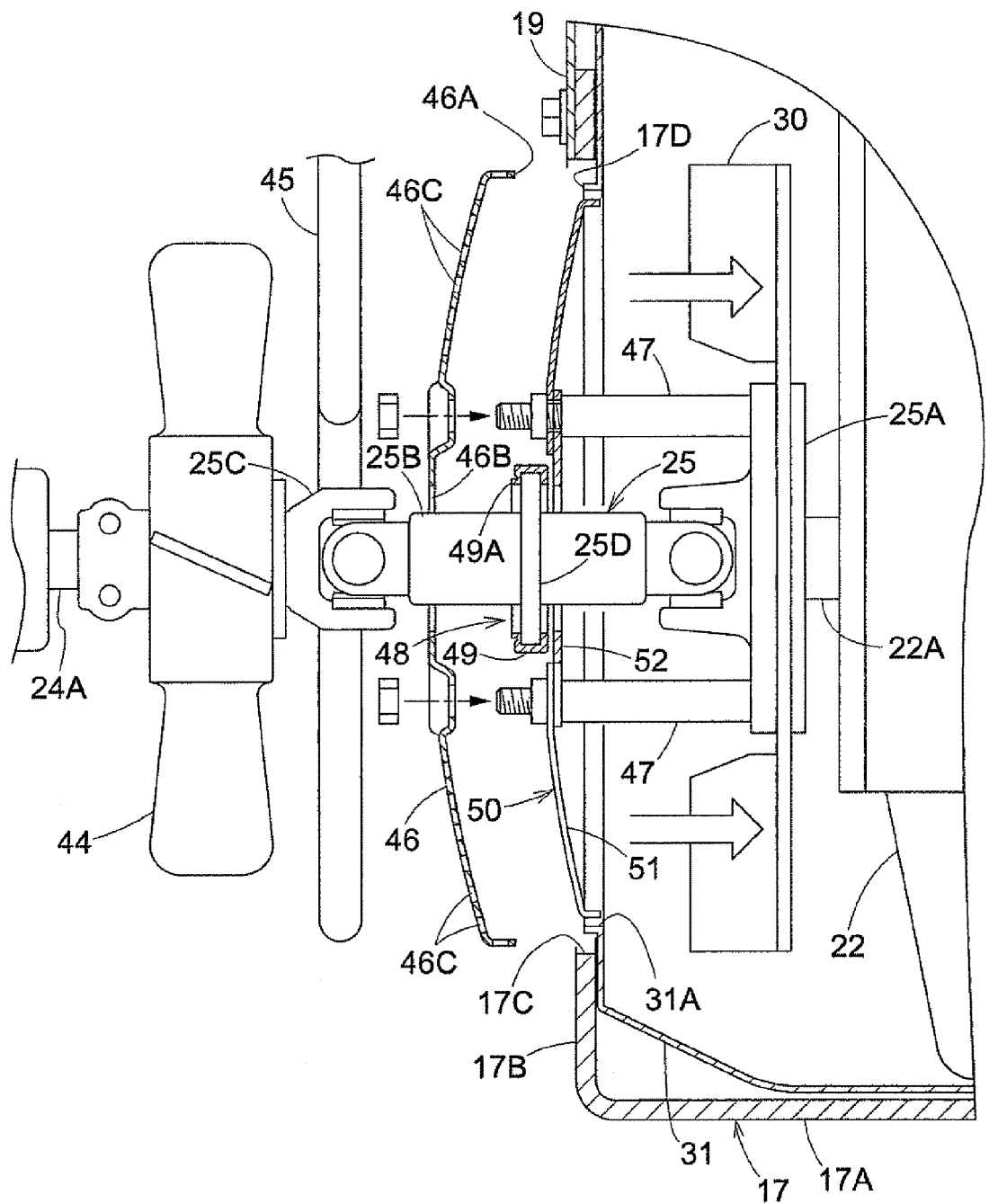
FIG. 5 is a longitudinal cross-sectional side view showing the step of attaching the perforated board.
Figure 6:
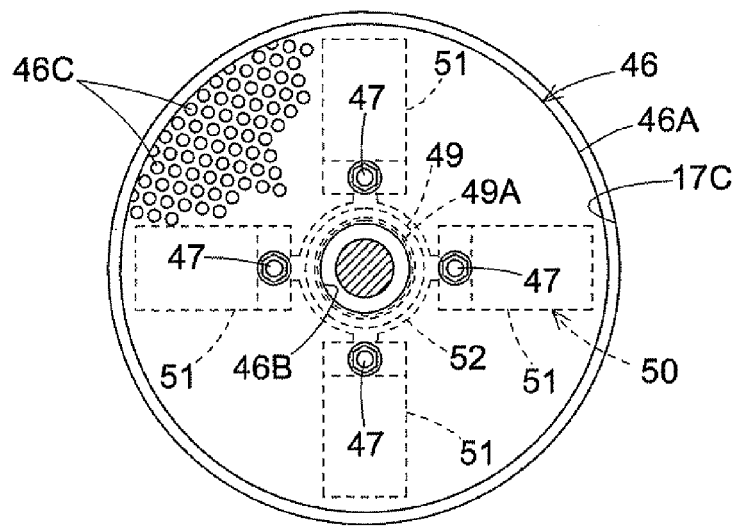
FIG. 6 is a longitudinal cross-sectional front view of the perforated board.

A dust prevention plate 36 for blocking a space 35 from below is mounted at the front bottom part of the rear frame 7 between the left and right side members 16, the space being formed between the mounting stand 17 positioned at the rear part of the rear frame 7 and the transmission mechanism 24 and left and right HSTs 26 positioned at the front part, as shown in FIGS. 2 and 3. It is thereby possible for the suction action of the cooling fan 30 to allow outside air above the vehicle body containing few grass cuttings or other such small debris to flow into the engine compartment to cool the engine, while impeding outside air below the vehicle body containing numerous grass cuttings or other such small debris from flowing into the engine compartment to cool the engine. As a result, it is possible to suppress overheating brought about by a process in which grass cuttings and other such small debris flow into the engine compartment, adhere to and accumulate in the periphery of the engine 22, the inside surface of the rear cover 20, and other locations, and impede the flow of outside air in association with the cooling of the engine 22. It is also possible to greatly reduce the labor required for cleaning operations for removing grass cuttings or other such small debris from the periphery of the engine 22 and other locations.

A dust prevention cover 39, which together with the partitioning wall 19 forms an outside air inlet channel 38 for taking in outside air, is integrally mounted on the front end part of the top cover 21, as shown in FIGS. 1 through 3. The dust prevention cover 39 is provided with a plurality of perforated boards 39A for removing grass cuttings or other such small debris from the outside air above the vehicle body led into the outside air inlet channel 38. Purer outside air can thereby be led into the outside air inlet channel 38 to cool the engine. Though not shown in the diagrams, the dust prevention cover 39 that is separate from the top cover 21 is detachably erected on the rear frame 7.

Mounted on the dust prevention plate 36 is an opening and closing lid 40 for opening and closing an opening 36A formed in the bottom of the dust prevention plate 36, as shown in FIGS. 2 and 3. The opening and closing lid 40 vertically swings open and closed, the fulcrum being a spindle 41 oriented left to right and provided at the bottom of the front end of the dust prevention plate 36. A torsional spring 42 for urging the opening and closing lid 40 closed is fitted over the spindle 41. It is thereby possible to discharge grass cuttings or other such small debris accumulated on the inside surface of the opening and closing lid 40 to the outside of the vehicle by inserting one's hand toward the opening and closing lid 40 from the rear of the vehicle body and opening the opening and closing lid 40 against the urging of the torsional spring 42.

A threaded part 40A for allowing a bolt 43 to be attached to and removed from the opening and closing lid 40 from the outer left is provided toward the swing fulcrum of the opening and closing lid 40 so as to be positioned on the upper side of the opening and closing lid 40. The bolt 43 is thereby brought into contact with the dust prevention plate 36 due to the urging of the torsional spring 42 when the bolt 43 is screwed into the threaded part 40A in a state in which the opening and closing lid 40 is operated to become open, whereby the opening and closing lid 40 can be held in the open state. As a result, grass cuttings and other small debris that have adhered to the inside surface of the opening and closing lid 40 or have adhered to and accumulated in the interior of the dust prevention plate 36 can be easily removed.

Though not shown in the drawings, another option is a configuration in which an insertion part which allows a pin to be attached to and removed from the opening and closing lid 40 from the outer left is provided toward the swing fulcrum of the opening and closing lid 40 so as to be positioned on the upper side of the opening and closing lid 40. The pin, having been inserted through the insertion part in a state in which the opening and closing lid 40 is operated to become open, is brought into contact with the dust prevention plate 36 by the urging of the torsional spring 42, whereby the opening and closing lid 40 can be held in the open state.

The threaded part 40A or the insertion part is also positioned downstream of the dust prevention plate 36 toward the swing fulcrum of the opening and closing lid 40 in the dust prevention plate 36. The bolt 43 or pin inserted into the threaded part 40A or insertion part while the opening and closing lid 40 remains open comes into contact with the opening and closing lid 40 due to the urging of the torsional spring 42, whereby the opening and closing lid 40 is held in the open state.

A cooling fan 44 for the speed change device is provided to the second connecting shaft 25C of the universal coupling 25, as shown in FIGS. 2 through 5, wherein the cooling fan 44 rotates integrally with the second connecting shaft 25C. The rotation of the cooling fan 44 causes outside air farther toward the front of the vehicle body than the transmission mechanism 24 or the left and right HSTs 26 to be drawn in, and the drawn-in air flows around the peripheries of the transmission mechanism 24 and the left and right HSTs 26. The transmission mechanism 24 and the left and right HSTs 26 are thereby cooled.

Placed between the front wall 17B of the mounting stand 17 and the cooling fan 44 for the speed change device is an oil cooler 45 for cooling oil supplied while being circulated to the hydraulic cylinder 15, the transmission mechanism 24, the left and right HSTs 26, a hydraulic clutch (not shown) used to connect and disengage operating power and provided within the transmission mechanism 24, and other components. The oil cooler 45 is formed so as to extend from the space between the front wall 17B of the mounting stand 17 and the cooling fan 44 for the speed change device up to the outside air inlet channel 38, and the lower part of the oil cooler 45 spans over the universal coupling 25. Outside air that cools the engine and flows through the outside air inlet channel 38 can thereby be supplied to the upper part of the oil cooler 45, and outside air for cooling the speed change device can be supplied to the lower part of the oil cooler 45.

Connected to the first connecting shaft 25A of the universal coupling 25 via four bolts 47 or the like is a metal perforated board 46 for preventing grass cuttings or other such small debris from flowing into the engine compartment through the opening 17C in the mounting stand 17 by rotating together with the cooling fan 30 integrally with the output shaft 22A of the engine 22 around the output shaft 22A, as shown in FIGS. 2 through 6.

The perforated board 46 is composed of a perforated metal plate shaped as a dish whose center extends toward the front of the vehicle body, and provided with a circular shape when viewed from the front. The outer peripheral edge 46A thereof is formed to be larger in diameter than the outside diameter of an open edge 17D so as to enclose the open edge 17D, which protrudes from the front wall 17B toward the front of the vehicle body. Formed in the center of the perforated board 46 is a insertion hole 46B for inserting the intermediate shaft 25B located farther down along the power transmission direction in the universal coupling 25. The insertion hole 46B is formed to be larger in diameter than the shaft diameter of the intermediate shaft 25B so as to ensure a space that allows interference between the perforated board 46 and the intermediate shaft 25B to be avoided.

A radially extending flange 25D for closing off a space 48 formed between the intermediate shaft 25B and the perforated board 46 as seen from the longitudinal direction of the vehicle body is formed on the intermediate shaft 25B in proximity to the insertion hole 46B, and an elastically deformable rubber ring member 49 is detachably fitted over and mounted on the flange 25D. A lip-shaped bonding part 49A, which encloses the insertion hole 46B and adheres firmly to the back surface of the perforated board 46, is formed on the ring member 49. In this embodiment, a seal unit is configured from the flange 25D and the ring member 49, and the seal unit overall has the shape of a ring.

The structure of the seal unit makes it possible to form the insertion hole 46B of the perforated board 46 to a diameter sufficiently large to avoid interference between the perforated board 46 and the intermediate shaft 25B as a result of component precision, assembly precision, bending deformation of the universal coupling 25 due to the vibration of the engine 22 or the like, and other such causes. The seal unit configuration also makes it possible to reliably inhibit the flow of grass cuttings or other such small debris into the engine compartment through the space 48 between the intermediate shaft 25B and the perforated board 46. As a result, it is possible to prevent the occurrence of unusual sounds as well as damage to the perforated board 46 resulting from the intermediate shaft 25B interfering with the perforated board 46, and also to more effectively suppress the danger of overheating resulting from grass cuttings or other such small debris flowing into the engine compartment, adhering to and accumulating in the periphery of the engine 22, the inside surface of the rear cover 20, and other locations, and impeding the flow of outside air. The labor needed for a cleaning operation to remove grass cuttings or other such small debris from the periphery of the engine 22 and other locations can also be further reduced.

A cutter 50 for cutting the grass cuttings in ventilation holes 46C in the perforated board 46 by rotating integrally with the output shaft 22A of the engine 22 and around the output shaft 22A together with the cooling fan 30 and the perforated board 46 is connected via the four bolts 47 or the like together with the perforated board 46 to the first connecting shaft 25A of the universal coupling 25. The grass cuttings entering the engine compartment through the ventilation holes 46C of the perforated board 46 together with the outside air are thereby cut more finely by the cutter 50, accumulation of grass cuttings on the engine 22 and other components can be reduced, and instances of grass cuttings or other such small debris further accumulating on the already trapped grass cuttings can therefore be suppressed. As a result, it is possible to more effectively suppress the danger of overheating resulting from grass cuttings or other such small debris adhering to and accumulating in the engine compartment and impeding the flow of outside air, and also to further reduce the labor needed for a cleaning operation to remove the grass cuttings and other small debris that have adhered to and accumulated in the engine compartment.

The cutter 50 is configured from four cutting blades 51 and a stay 52 extending between the blades. The cutting blades 51 are formed along the inside surface of the perforated board 46.

Figure 8:
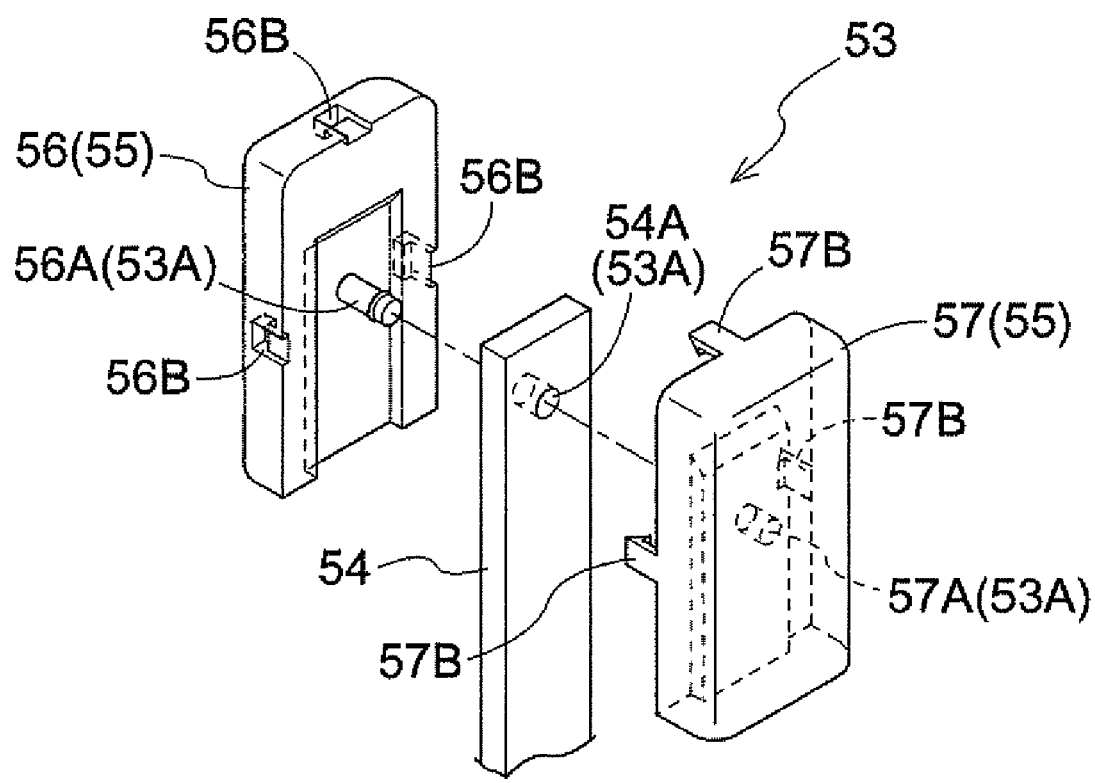
FIG. 8 is a partial exploded perspective view showing the configuration of the clutch lever.

A clutch lever 53 operatively connected to the hydraulic clutch for engaging and disengaging operating power is disposed to the right of the driver seat 11, as shown in FIGS. 1 and 8. The clutch lever 53 has a lever body 54 made of band steel mounted to the rear frame 7 and capable of swinging forward and backward, and an attachment hole 54A for a grip is formed in the free end of the lever body 54, which has a grip 55 made of a resin provided to the lever body 54. The grip 55 has a bisected structure that can be separated to the left and right, and a linking pin 56A formed in a right-side member 56 of the grip 55 is inserted through the attachment hole 54A of the lever body 54. The pin is also inserted through and linked with a linking hole 57A formed in a left-side member 57. Three linking pawls 57B are linked to three linked parts 56B formed in the right-side member 56, the linking pawls 57B being formed in the left-side member 57 so as to correspond to the linked parts 56B, whereby the right-side member 56 and the left-side member 57 are fitted over and mounted to the free end of the lever body 54.

In other words, in the clutch lever 53, a securing part 53A for securing the grip 55 to the lever body 54 is created by the attachment hole 54A of the lever body 54, the linking pin 56A of the right-side member 56, and the linking hole 57A of the left-side member 57. This configuration may also be used in the speed change levers 12 and other such operating levers.

Other Embodiments

[1] The riding lawn mower to which the present invention is applied may be a front mower in which the engine 22 is mounted in the rear of the travelling vehicle body 1 and the mower 4 is placed in front of the left and right front wheels 2, or a mid-mount mower in which the engine 22 is mounted in the front of the travelling vehicle body 1 and the mower 4 is placed between the left and right front wheels 2 and the left and right rear wheels 3.

[2] The riding lawn mower may be equipped with a water-cooled engine 22, and may be configured so that the engine 22 is mounted in a vibration-proof manner.

[3] The speed change device 24 may be a hydrostatic device or planetary device capable of a continuously variable speed change operation, or a geared device capable of a stepped speed change operation.

[4] The universal coupling 25 may be configured so that the intermediate shaft 25B can be extended and retracted.

[5] The separating wall 17B may be independent from the other wall parts.

[6] The perforated board 46 may be configured as a perforated plate in the form of a bowl in which portions located closer to the center become more extended toward the front of the vehicle body, with the plate having a circular shape as seen from the front. The board may also be shaped as a discoid perforated plate which does not extend to the front of the vehicle body, or as a plate or bowl in which a dust-removing net is provided to the frame.

[7] The configuration may be designed so that the second connecting shaft 25C of the universal coupling 25 is inserted through the insertion hole 46B of the perforated board 46, the flange 25D is formed on the second connecting shaft 25C, and the ring member 49 bonded to the perforated board 46 so as to enclose the insertion hole 46B is fitted over and mounted to the flange 25D.

[8] The flange 25D of the second connecting shaft 25C may be designed so as to not close off the space 48 formed between the intermediate shaft 25B and the perforated board 46 as viewed from the longitudinal direction of the vehicle body.

[9] The ring member 49 may be adapted to enclose the insertion hole 46B and be fitted and mounted in the insertion hole 46B of the perforated board 46 so as to bond to the flange 25D of the universal coupling 25.

[10] A member formed from a resin other than rubber may be used as the ring member 49.

[11] The ring member 49 may be engageably linked to the perforated board 46 or the flange 25D, and may be fixed in place with an adhesive or the like.

[12] The ring member 49 may be designed so that the bonding part 49A corresponding to the perforated board 46 or the flange 25D is not formed into a lip shape.

[13] Various changes can be made to the cutting blades 51 of the cutter 50 in terms of number, shape, and other such features.

[14] A configuration not provided with the cutter 50 may be used.

[15] The peripheral edges of the ventilation holes 46C in the perforated board 46 may be formed so as to function as blade edges, and the perforated board 46 may also be used as a cutter.

What is claimed is:

1. A dust removal system for a riding lawn mower comprising an engine disposed within an engine compartment partitioned by a separating wall, a speed change device disposed outside of the engine compartment, and a universal coupling inserted through an opening provided in the separating wall in order to connect an output shaft of the engine with an input shaft of the speed change device; the dust removal system comprising:

a perforated board which rotates integrally with the output shaft around the axis of the output shaft in order to inhibit grass cuttings from flowing into the engine compartment through the opening, wherein the perforated board comprises a centrally located insertion hole defined by an inner peripheral edge of the perforated board, and the insertion hole comprises a diameter sufficiently large to avoid contact interference between the inner peripheral edge of the perforated board and an outer periphery of the universal coupling, the inner peripheral edge of the perforated board and the outer periphery of the universal coupling defining a space therebetween; and a seal unit substantially sealing the space between the outer periphery of the universal coupling and the inner peripheral edge of the perforated board.

2. The dust removal system of claim 1, wherein the seal unit comprises a ring member.

3. The dust removal system of claim 1, wherein the seal unit is supported between the outer periphery of the universal coupling and the inner peripheral edge of the perforated board.

4. The dust removal system of claim 1, wherein at least part of the seal unit is an elastic member.

5. The dust removal system of claim 1, wherein the seal unit comprises a radially extending flange formed on the universal coupling, and a ring member mounted on the flange and in contact at an outer peripheral edge thereof with the inner peripheral edge of the perforated board.

6. The dust removal system of claim 1, further comprising:
a cutter which rotates integrally with the perforated board around the output shaft, the cutter being disposed nearer to the engine than the perforated board.

7. The dust removal system of claim 6, wherein the perforated board and the cutter are supported on the output shaft by a shared attachment member.

8. The dust removal system of claim 7, wherein the attachment member is fixed to an engine-cooling fan attached to the output shaft.

9. The dust removal system of claim 1, wherein the universal coupling comprises an intermediate shaft, a first connecting part of the intermediate shaft coupled to the output shaft of the engine and a second connecting part of the intermediate shaft coupled to a cooling fan, and wherein the space is formed about the intermediate shaft and the seal unit is disposed on the intermediate shaft.

10. The dust removal system of claim 9, wherein the perforated board is supported on the first connecting part.

11. A dust removal system for a riding lawn mower comprising an engine disposed within an engine compartment partitioned by a separating wall, a speed change device disposed outside of the engine compartment, and a universal coupling inserted through an opening provided in the separating wall in order to connect an output shaft of the engine with an input shaft of the speed change device; the dust removal system comprising:
a perforated board which rotates integrally with the output shaft around the axis of the output shaft in order to inhibit grass cuttings from flowing into the engine compartment through the opening, wherein the perforated board comprises a centrally located insertion hole defined by an inner peripheral edge of the perforated board, and the insertion hole comprises a diameter sufficiently large to avoid contact interference between the inner peripheral edge of the perforated board and the outer periphery of the universal coupling defining a space therebetween; and
wherein the peripheral board is mounted to a connecting shaft connecting the universal coupling to the output shaft of the engine.

12. The dust removal system of claim 11, further comprising:
a cutter which rotates integrally with the perforated board which rotates integrally with the output shaft, the cutter and the perforated board mounted together to the connecting shaft connecting the universal coupling to the output shaft of the engine.

\* \* \* \* \*